No. 782,394. PATENTED FEB. 14, 1905.
W. E. HEAL.
PROCESS OF MAKING GLASS.
APPLICATION FILED AUG. 13, 1903.

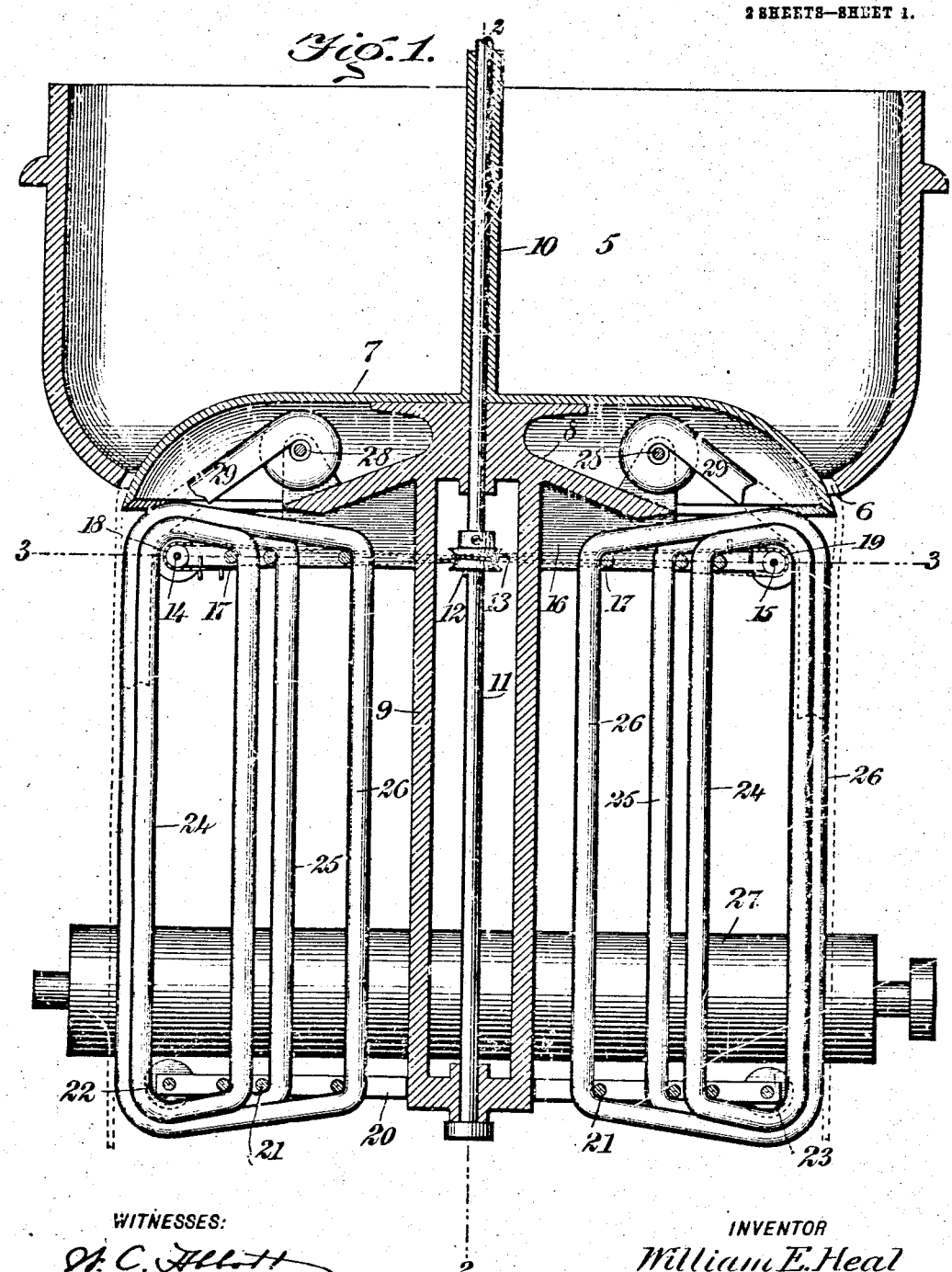

2 SHEETS—SHEET 2.

WITNESSES:

INVENTOR
William E. Heal
BY
ATTORNEYS

No. 782,394.  
Patented February 14, 1905.

UNITED STATES PATENT OFFICE.

WILLIAM E. HEAL, OF MARION, INDIANA.

PROCESS OF MAKING GLASS.

SPECIFICATION forming part of Letters Patent No. 782,394, dated February 14, 1905.

Application filed August 13, 1903. Serial No. 169,309.

*To all whom it may concern:*

Be it known that I, WILLIAM E. HEAL, a citizen of the United States, and a resident of Marion, in the county of Grant and State of Indiana, have invented new and useful Improvements in Processes of Making Glass, of which the following is a full, clear, and exact description.

I have in view as an object a process of making window or sheet glass by drawing a tubular sheet of molten glass having two partially-flat sides connected by semicylindrical or rounded ends, cutting the cylinder so drawn into suitable lengths, annealing the severed pieces, and cutting away the rounded connecting ends to form a plurality of flat sheets.

My invention consists in the novel process herein described and claimed.

Reference is to be had to the accompanying drawings, forming a part of this specification, which show an apparatus by the use of which my process may be carried out, and in which similar characters of reference indicate corresponding parts in all the figures.

Figure 3:
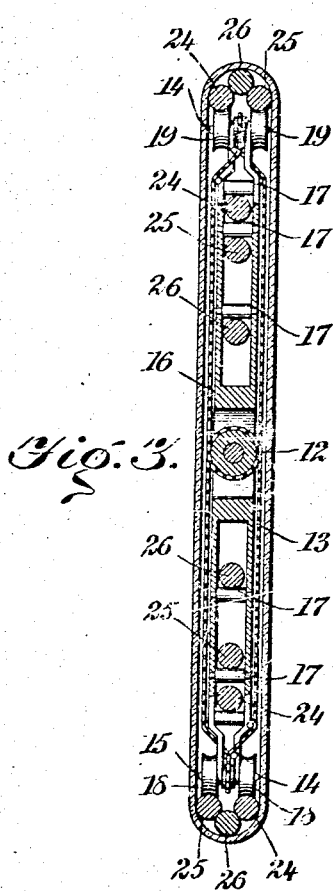
Figure 2:
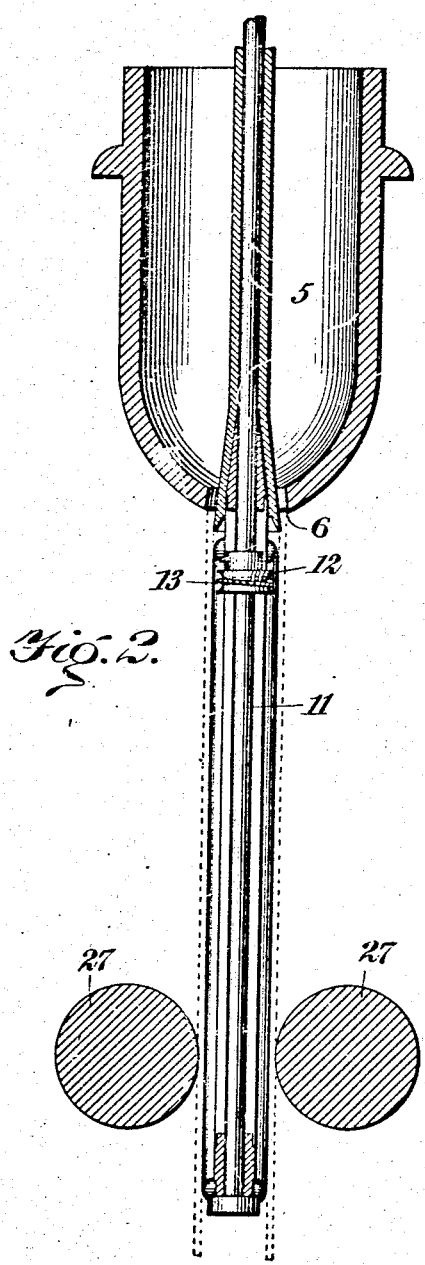

Figure 1 is a longitudinal vertical sectional view taken through apparatus. Fig. 2 is a transverse vertical sectional view taken on the line 2 2 of Fig. 1, and Fig. 3 is a horizontal sectional view taken on the line 3 3 of Fig. 1.

Referring now to the accompanying drawings in detail, 5 designates a tank or receptacle designed to contain molten glass of the proper viscosity for drawing, said receptacle having formed in the bottom thereof a longitudinal slot 6, approximately elliptical in form. In order to close or regulate the flow of material from the tank, I have provided the tank with a movable bottom, substantially in the shape of a curved or inverted plate, said bottom being indicated at 7 and supported upon a frame 8, provided with a relatively long standard or supporting member 9. This bottom portion, which is constructed of sheet-steel or similar metal, is movable vertically through the medium of any suitable adjusting device attached to the stem 10, said stem being approximately in the shape of a tube and extending upward from the top of the bottom plate 7. Extending through the stem 10 and the supporting-frame 8 is a relatively long shaft 11, having formed thereon a pulley 12, said shaft being adapted to be rotated by any suitable means whereby motion is imparted to an endless chain 13, extending around the pulley and over small sprocket-shafts 14 and 15, carried at the ends of the transverse frame member 16. Supported by this frame member 16 are a number of small transverse rollers 17, while at the ends of the frame and mounted upon the shafts 14 and 15 are the pulleys 18 18 and 19 19, designed for a purpose to be hereinafter described. At the base of the supporting-frame 9 is a second transverse or horizontal frame member 20, provided with small transverse rollers 21, spaced apart, and pulleys 22 and 23 similar to the pulleys 18 and 19. Passing over the rollers of the top and bottom transverse frame members are a number of vertically-arranged endless ropes, varying in size. Said ropes may be considered for the purpose of convenience as divided into three series, the ropes 24 24 arranged at opposite sides of the vertical standard 9 of the frame forming one series, while the ropes 25 25 and 26 26 similarly arranged form the other two series.

Arranged at the base of the apparatus and at the sides of the frame formed by the ropes or cables I have provided oppositely-rotated rolls 27 27, these rolls being designed for a purpose which will be further set forth hereinafter, while arranged beneath the inverted bottom plate 7 above the rope frames are the relatively short shafts 28 28, one on each side of the frame portion 8, these shafts carrying a roll of flexible material, such as asbestos cloth or the like, (shown at 29 29,) the construction being such that when desired the asbestos cloth may be drawn from said rollers and carried down vertically over the outer portions of the ropes of the frame, so as to cover the same in the manner clearly shown in dotted lines in Fig. 1.

The process of making the glass to be carried out with the aid of the above-described apparatus is as follows: The receptacle 5 is filled with molten glass in a condition for drawing, the bottom plate of the device having been adjusted to a proper position so that the opening or slot formed between the base of the tank and the plate is of the width it is desired to form the sheet. The cylinder of glass is drawn downward through the oval slot and over the flexible frame formed by the ropes, to produce tubular glass of uniform cross-section, until by cooling said glass shall have become sufficiently rigid to retain its form without the aid of such frame. It is to be noted that when the shaft 11 is rotated the endless ropes forming the frame will be driven and the short transverse rolls 17 and 21 act as guides for said ropes. The cylinder after passing downward over the endless ropes passes between the base-rolls 27 27, which further assist in smoothing and retaining the glass in its proper shape. These large rolls which grip the tubular glass on each side add their tractive force to that of gravity in drawing the cylinder, and said rolls may be made of asbestos cloth wound spirally around a shaft of iron or may be of asbestos disks clamped side by side upon the shaft. The asbestos aprons or sheets 29 29 are moved with the cylinder or tube of glass in order to prevent the hot glass from adhering to the ropes and so interfering with the drawing, these aprons being creased or folded along the median line so as to have the form of strips joined along the edge of each at an angle, thus serving the double service of causing the strips as they pass over the endless ropes to fit snugly to them and by making the rolls of asbestos cloth of suitable dimensions in cross-section they will not come into contact with the glass as it is being drawn downward. The apron of asbestos is not returned around the lower end of the frame, but is carried on with the moving cylinder and portions thereof stripped or cut as necessary. After the cylinder is drawn over the frame it is cut in suitable lengths transversely by any implement or by a red-hot iron applied thereto, and the pieces so severed are carried to the annealing-oven and placed standing on edge during the annealing process. After the annealing the rounded ends connecting the flat sides are cut away, leaving two flat sheets suitable for window-glass or similar purposes.

Various processes have been proposed for drawing glass in flat sheets from a mass of molten material, but have not been successful, for the reason that as the sheet is drawn it gradually narrows until it becomes a mere ribbon of glass. In the present instance this difficulty is obviated, as above explained, by drawing the tubular sheet over a flexible or semiflexible frame, formed in this case of a plurality of endless ropes or cables. By severing the curved ends of the glass tubes the process of flattening, necessary when glass is blown in cylinders of approximately circular cross-section, is dispensed with and the quality of glass improved, as contact with the stones in flattening causes oftentimes a marked defacing of the glass.

Having thus described my invention, I claim as new and desire to secure by Letters Patent—

1. The method of making sheet-glass which consists in flowing the molten glass through an elongated endless slot to form a flattened tube and rolling the flattened faces of said tube against a backing.

2. The method of making sheet-glass which consists in drawing the molten glass over a former, rolling the same against said former to form a tube with flat sides, cutting the said tube into sections, annealing the said sections, and severing the curved side edges of said sections to form a plurality of flat sheets, substantially as set forth.

3. The method of making sheet-glass which consists in flowing the glass in the form of an elongated flattened tube, the axis of said tube being vertical, cutting said tube into lengths, annealing the pieces so cut, and severing the curved side edges thereof to form flat sheets.

4. The process of making sheet-glass which consists in drawing molten glass through an endless elongated slot in the bottom of a crucible to form a flattened tube, supporting the contracting pressure of said tube to maintain the initial dimensions thereof as it hardens, and cutting sheets from said tube, substantially as set forth.

5. The process of making sheet-glass which consists in drawing molten glass through an endless elongated slot to form a flattened tube, supporting the contracting pressure of said tube on the interior to maintain a uniform dimension as it hardens, dividing the said tube into sections, and annealing said sections, substantially as set forth.

6. The method of making sheet-glass which consists in drawing molten glass through an endless elongated slot to form a flattened tube with acutely-convex edges, maintaining the dimension of said tube by supporting the contracting pressure thereof as it hardens, rolling the flat faces of said tube, and cutting the flat faces of the hardened tube into sheets, substantially as set forth.

7. The method of making sheet-glass which consists in drawing molten glass through an endless elongated slot in a vertical direction to form a flattened tube with a vertical axis, and dividing the flattened faces of said tube into sheets, substantially as set forth.

8. The method of making sheet-glass which consists in drawing molten glass through an endless elongated slot to form a tube with flat faces united by convex faces, resisting the inward pressure of said convex faces from the inside throughout a portion of the length thereof to maintain the dimension of said tube, and dividing said flat faces thereafter into sheets, substantially as set forth.

9. The method of making sheet-glass which consists in drawing molten glass through an endless elongated slot to form a tube with flat faces connected by convex faces, and advancing longitudinally-disposed members in contact with said convex faces in the direction that the glass draws, substantially as set forth.

10. The method of making sheet-glass which consists in drawing the molten stock through an endless elongated slot, to form a tube with flat faces united by convex faces, and advancing cords as the tube draws, said cords resting against the inner side of said convex faces.

11. The method of making sheet-glass which consists in drawing the molten stock through an opening to form a tube with flat faces uniting convex faces, and advancing longitudinally-disposed endless cords resting against said convex faces on the inner side thereof as the tube draws, employing non-combustible material.

12. The method of making sheet-glass which consists in drawing molten stock over a frame to form a flattened tube and drawing a non-conducting material between said tube and said frame to protect the same, substantially as set forth.

13. The method of making sheet-glass which consists in drawing vertically the molten stock in the form of a tube with flat sides uniting convex faces, maintaining the width of said tube with a plurality of endless cords disposed longitudinally behind the said convex faces, drawing a ribbon of non-combustible material between said cords and said tube, advancing said cords as said tube draws, and rolling the flat sides of said tube against said frame, substantially as set forth.

14. The method of making sheet-glass which consists in drawing molten stock through an elongated opening to form a tube with flat faces uniting convex faces, advancing endless cords disposed longitudinally to support pressure on the inner sides of said convex faces, and drawing a protecting-ribbon between the said cords and said tube as the tube draws, substantially as set forth.

15. The method of making glass which consists in drawing the molten glass over a former and drawing a sheet of protective material between said former and said glass to protect the former.

In testimony whereof I have signed my name to this specification in the presence of two subscribing witnesses.

WILLIAM E. HEAL.

Witnesses:
GRIFFITH D. DEAN,
WM. H. CARROLL.